March 19, 1929.  W. KUMMERER  1,706,030
TRANSFERRING MEANS FOR ELECTROMAGNETIC WAVE ENERGY
Filed June 30, 1926
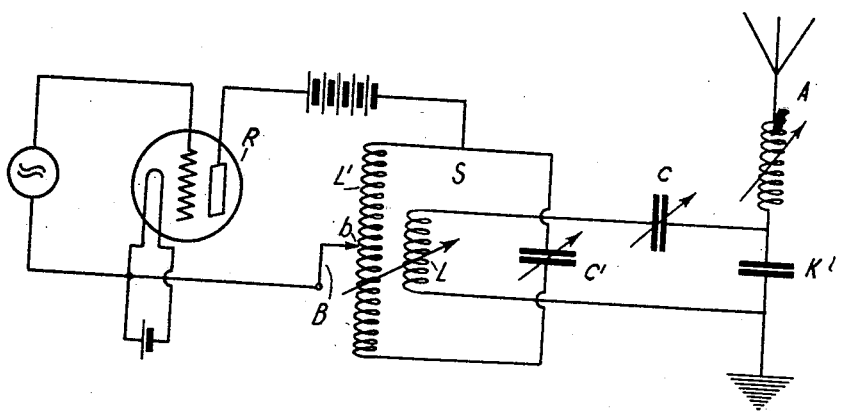
INVENTOR.
WILHELM KUMMERER
BY Ira J. Adams
ATTORNEY.

Patented Mar. 19, 1929.

1,706,030

UNITED STATES PATENT OFFICE.

WILHELM KUMMERER, OF BERLIN, GERMANY, ASSIGNOR TO GESELLSCHAFT FUR DRAHTLOSE TELEGRAPHIE M. B. H., OF BERLIN, GERMANY, A CORPORATION OF GERMANY.

TRANSFERRING MEANS FOR ELECTROMAGNETIC WAVE ENERGY.

Application filed June 30, 1926, Serial No. 119,595, and in Germany September 24, 1925.

The present invention relates to an arrangement adapted to transfer energy of electromagnetic waves which is of such a nature that substantially only the wave of a desired frequency is transferred, whereas waves of higher frequency such as overtones which, as is well known, are often produced in generator connections, are precluded from the consumer or load circuit. To suppress harmonics it is a well-known scheme to provide intermediate circuits which are tuned to the working or useful frequency. However, it has been found from practical experience that this by itself is insufficient to adequately preclude overtones of relatively large intensity from the consuming circuit, for instance, a transmission aerial. In order to attain this end it is necessary to couple the intermediate or transfer oscillation circuit in some special manner with the exciting and consuming circuits.

According to the invention, this intermediate circuit is coupled inductively with the exciting circuit, and by purely capacitive means with the consumer circuit, the capacitive coupling being effected in such a manner that in series with the tuning condenser a separate coupling condenser is provided and the consuming circuit (antenna) with this coupling condenser is united directly. It is furthermore a good plan to make the inductive coupling of a variable nature in order that more or less energy may be supplied to the consuming circuit by this means.

In a great number of wireless telegraphy circuit arrangements, the generator works upon an oscillation circuit which is contained in a circuit which is connected with the generator; in other words, the oscillation circuit is united with the generator by what is known as a current resonance connection. In such a circuit arrangement it is advisable to inductively couple the transfer circuit with the exciting circuit in such a manner that the load of the capacitive and the inductive branch of the exciting oscillation circuit becomes equal. This is produced, for instance, by connecting the current supply leads to the exciting circuit in such a manner that one is connected between the condenser and one end of the coil, and so that the other one is connected with a point of the coil. The transfer circuit is then symmetrically coupled with the two portions of the coil in a well-known manner.

The accompanying drawing illustrates, by way of example, one form of construction of the invention.

Referring to the drawing, R is a separately excited transmitter tube whose working oscillation circuit S is so inserted in the plate circuit of the transmitter tube that the plate is united with a point between the self-inductance coil L' and the condenser C' of the tube output circuit, while the lead B to the cathode is taken off at a convenient point $b$ of the inductance coil L'. The transfer or intermediate circuit, according to the invention, is then inductively coupled with the inductance coil L' in a symmetric manner. The said intermediate circuit, apart from the inductance coil L which is used as the coupling coil at the same time, contains the tuning condenser $c$ and a large coupling condenser K to which the antenna A is connected. It will be noted from what precedes that the harmonics will in this arrangement be kept away from the aerial. It is a well-known fact that the inductive branch of the working oscillation circuit of the tube carries fewer harmonics than the capacitive circuit. Hence, harmonics reach the intermediate circuit particularly by virtue of the differential action of the inductively and the capacitively acting branch of the working oscillation circuit S. Now, on account of the fact that the coupling between the antenna and the transfer circuit is relatively loose (that is to say, the condenser K is made substantially larger than the tuning condenser $c$,) the potentials of the harmonics which are set up at the coupling condenser will be but relatively low. Consequently, in addition to the filter effect of the intermediate circuit, there is insured a further reduction in the transfer of overtones in a kind of coupling as hereinbefore set forth.

Having described my invention, I claim:

1. A circuit arrangement adapted to eliminate generator overtones in a radiating circuit, comprising a generator having an output circuit, said output circuit comprising an inductance provided with a variable tap and a capacitance arranged in parallel thereto, an intermediate energy transfer circuit loosely coupled by inductive means to the said generator output circuit, said intermediate circuit comprising a capacitance composed of at least two capacities connected in series, said radiating circuit being loosely coupled to the said intermediate circuit by means of one of said capacities.

2. A system of the class described for minimizing harmonics or overtones from a radiating circuit, comprising an oscillation generator having a tuned output circuit, a tuned intermediate transfer circuit coupled between the tuned output circuit and said radiating circuit, the coupling between said output and transfer circuits being inductive and symmetrically arranged, and the coupling between transfer and radiating circuits being capacitive.

3. In a circuit arrangement adapted to eliminate generator overtones in a transmission circuit, a generator having an output circuit, said output circuit comprising an inductance provided with a variable tap and a capacitance arranged in parallel thereto, an intermediate energy transfer circuit loosely coupled by inductive means to the said generator output circuit, said transfer circuit containing a variable and a fixed condenser arranged in series therewith, said transmission circuit being capacitively coupled with said fixed capacity, said capacity forming a loose coupling for said last mentioned circuit.

4. An energy transfer circuit comprising a generator connected to the input circuit of a triode, an output circuit connected to said triode, said output circuit comprising an inductance provided with a variable tap and a capacity arranged in parallel thereto, said variable tap being between said inductance and a point on the cathode member of said triode to which the generator is connected, an intermediate circuit provided with an inductance and at least two capacities of which one is variable all arranged in series, said inductance serving to loosely couple said intermediate circuit with the triode output circuit, and said capacitance being adapted to capacitively couple said intermediate circuit to an antenna output circuit, said last named output circuit being in series with the fixed capacity contained in the said intermediate circuit.

WILH. KUMMERER.